US012355867B2

(12) United States Patent
Bakshi et al.

(10) Patent No.: US 12,355,867 B2
(45) Date of Patent: Jul. 8, 2025

(54) SECURE DISTRIBUTION OF CRYPTOGRAPHIC KEYS AND POLICY ATTRIBUTES BASED ON GEOGRAPHIC TRUSTED LOCATION

(71) Applicant: Cisco Technology, Inc., San Jose, CA (US)

(72) Inventors: Kapildeep Singh Bakshi, Herndon, VA (US); Craig Thomas Hill, Sterling, VA (US); Raymond Allan Blair, Keizer, OR (US); Michael Alan Kowal, Summit, NJ (US); Steven M. Carter, College Grove, TN (US); Stephen Michael Orr, Wallkill, NY (US)

( * ) Notice: Subject to any disclaimer, the term of this patent is extended or adjusted under 35 U.S.C. 154(b) by 219 days.

(21) Appl. No.: 18/115,718

(22) Filed: Feb. 28, 2023

(65) Prior Publication Data
US 2024/0291639 A1  Aug. 29, 2024

(51) Int. Cl.
| H04L 29/06 | (2006.01) |
| H04L 9/08 | (2006.01) |
| H04L 9/14 | (2006.01) |
| H04L 9/32 | (2006.01) |
| H04L 9/40 | (2022.01) |
| H04W 12/64 | (2021.01) |

(52) U.S. Cl.
CPC ............ *H04L 9/083* (2013.01); *H04L 9/08* (2013.01); *H04L 9/14* (2013.01); *H04L 9/321* (2013.01); *H04L 9/40* (2022.05); *H04W 12/64* (2021.01)

(58) Field of Classification Search
CPC ... H04L 63/0428; H04L 9/0894; H04L 9/088; H04L 63/107; H04L 9/083; H04L 9/40; H04L 9/08; H04L 9/14; H04L 9/321; G06F 2221/2111; H04W 12/0431; H04W 12/64

See application file for complete search history.

(56) References Cited

U.S. PATENT DOCUMENTS

| 6,948,062 | B1 | 9/2005 | Clapper | |
| 8,856,916 | B1 | 10/2014 | Sobel | |
| 2007/0086593 | A1 | 4/2007 | Denning et al. | |
| 2013/0031598 | A1* | 1/2013 | Whelan | H04W 12/08 726/28 |
| 2013/0309971 | A1* | 11/2013 | Kiukkonen | H04W 12/50 455/41.2 |
| 2015/0271156 | A1 | 9/2015 | Ronca | |
| 2015/0271157 | A1 | 9/2015 | Ronca | |

(Continued)

*Primary Examiner* — Yogesh Paliwal
(74) *Attorney, Agent, or Firm* — Lee & Hayes, P.C.

(57) ABSTRACT

Techniques for ensuring that geographic location specific security policies are enforce for an agent or agent device. An Agent service of an agent device accesses an Agent Authentication Service for a key to initiate one or more functions of the agent device. The Agent Authentication Service determines the location of the agent device and determines whether the agent device is within an approved geographic location based on geographic location specific security policies. If the agent device is within the approved geographic location, the Agent Authentication Services accesses a Key Management Service for a cryptographic key and delivers the cryptographic key to the Agent. If the Agent Authentication Service determines that the Agent device is outside of the approved location, access to the cryptographic key is denied.

17 Claims, 9 Drawing Sheets

(56) References Cited

U.S. PATENT DOCUMENTS

2017/0126698 A1* 5/2017 Minkovich ............. G06F 21/00
2018/0063101 A1* 3/2018 Clark .................... H04L 63/061
2022/0092193 A1* 3/2022 Nijasure ............. G06F 21/6218

* cited by examiner

SECURE DISTRIBUTION OF CRYPTOGRAPHIC KEYS AND POLICY ATTRIBUTES BASED ON GEOGRAPHIC TRUSTED LOCATION

TECHNICAL FIELD

The present disclosure relates generally to ensuring networked device security based on geographical location.

BACKGROUND

Computer devices have become a ubiquitous element of life and have evolved from simple desktop computers to many types of devices including Internet of Things (IOT) devices, smart watches and health trackers, cellular phones, autonomous vehicles such as autonomous aircraft such as drones or self-driving cars. Often these devices are connected with one or more of various computer networks, such as, but not limited to Local Area Networks (LANs), Virtual Large Area Networks (VLANs), Virtually extensible Local Area Networks (VXLANs), Wide Area Networks (WANs) such as the internet, etc.

With such a plethora of computing devices, security issues can be a great concern. Security Policies can be implemented and can be specific to a particular type of device or application. Mobility of such devices can also further raise security concerns. The ability to easily move a computer device can raise security issues when such a device is moved outside of a secure area such as a military complex or business campus in the case of a business that wishes to protect vital proprietary technology. In addition, the ability to easily move a computer device outside of a certain jurisdiction (such as a country) can raise concerns such as with regard to the possible violation of export control regulations or exposure of sensitive technology to hostile governments or entities.

Therefore, there remains a need for techniques for enforcing security policies with regard to an easily mobile computer device. Such techniques would preferably include the ability to ensure enforcement of locations specific security policies that can be tailored to a particular device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
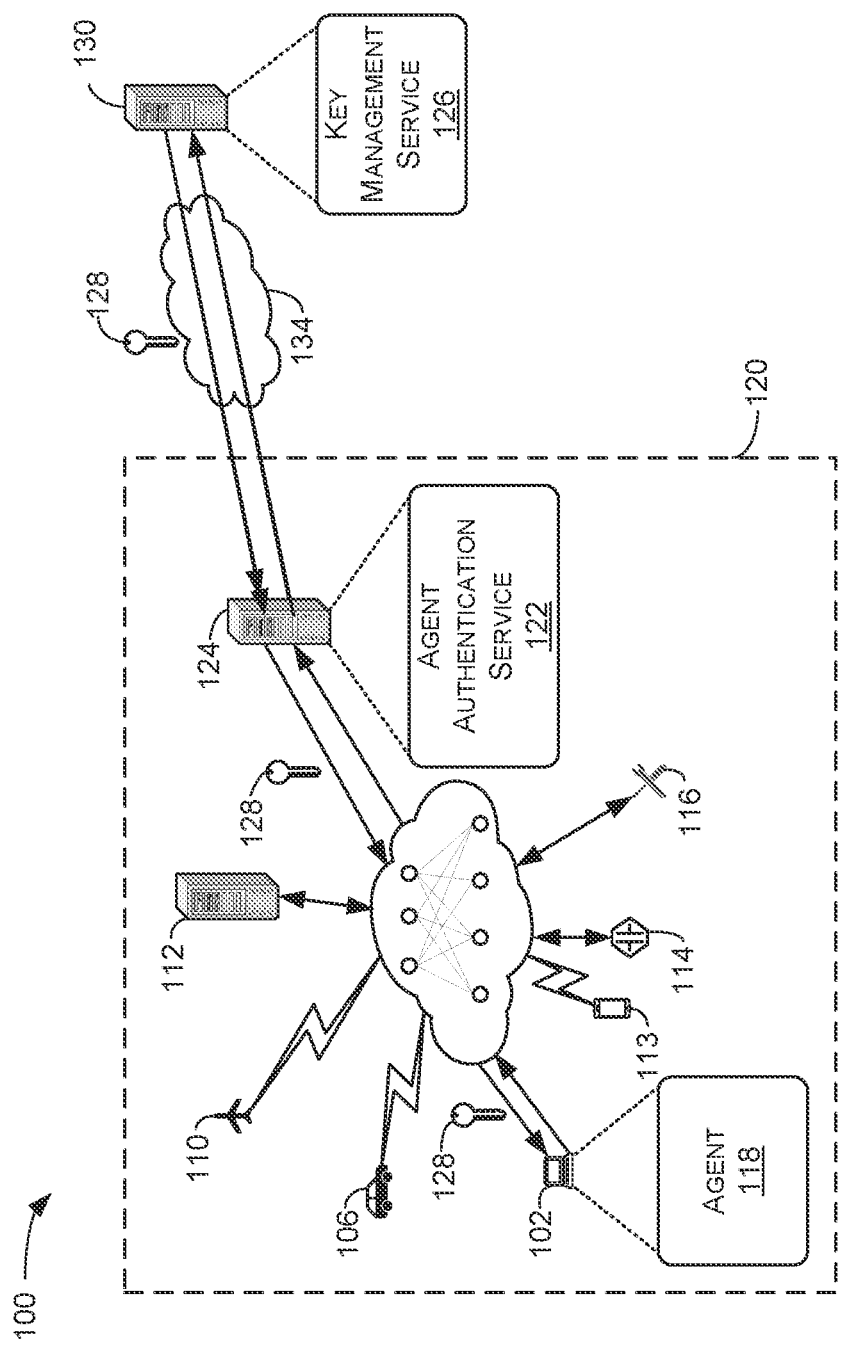
FIG. 1 is a schematic illustration showing a system for enforcing location-based security policies according to an embodiment.

This disclosure describes techniques for securely distributing cryptographic keys and/or other location specific policies based on geographic location of an agent device. A request for access to cryptographic keys or other access is received from an agent device. A geographic location of the agent device is determined. The geographic location of the agent device is compared with one or more location specific security policies to determine whether the agent device is located within an approved geographic location. If it is determined that the agent device is within an approved geographic location, a request for cryptographic keys or other location specific access policy is sent to a key management service, and a cryptographic key or other policy is received from a key management service. If it is determined that the agent device is not within the approved geographic location, then access to the cryptographic key is denied.

Additionally, the techniques described herein may be performed by a system and/or device having non-transitory computer-readable media storing computer-executable instructions that, when executed by one or more processors, performs the method described above.

EXAMPLE EMBODIMENTS

The techniques described herein address existing challenges in data communications where there remains a lack of ability to identify and determined the specific location of devices such as computers or computer storage and to identify that these devices comply with strict location sovereignty policies enforced through different compliance organizations. These methods provide the ability to control and enforce geographic locations specific policies on specific devices and allow compliance regulators to get a real-time view of where the device or computer resource is located, cross-referenced to where it is supposed to be and to have policy enforcement checks run against these techniques. In some embodiments, this can be a closed loop process. Access to any devices, computers or computer storage can only be accessed with explicit verification of the location compliance, which allows the proper key exchange and placement to be executed for further access. Additionally, the communication and connecting functions of these devices are allowed through cryptographic functions, only via the location policy and key exchange and generation based on set geographic location policies.

In one embodiment, the system includes three basic components: a Key Management Service (Key-Master): an Agent Authentication Service (Gate-Keeper); and an Agent (device to be accessed). The Key Management Service or device is a trusted storage repository of keys such as cryptographic keys used to unlock an agent device. The Key Management Service can also include a database of Agents, the locations at which they are authorized to operate, and the keys and policy attributes that those agent devices are allowed to access. The Key Management Service authenticates the Agent Authentication Service (Gate-Keeper) and Agents and confirms that they are in a trusted location prior to distributing any cryptographic keys or policy attributes.

The primary function of the Agent Authentication Service (Gate-Keeper) is to proxy Agent Authentication and geographic location information of the Agent to the Key Management Service (Key-Master). The Agent Authentication Service (Gate-Keeper) should have the capability to derive its location from a trusted external source and establish connection with the Key Management Service (Key-Master). The Agent Authentication Service can be a device that is separate from the Agent. If the Agent is a component of an agent device that has the ability to determine its own geographic location, then the Agent and Agent Authentication Service can include circuitry and/or logic that reside on the same agent device. On the other hand, if the agent device does not include the ability to determine its own geographic location, then the Agent Authentication Service can include logic and/or circuitry located on a device separate from the agent device that has the ability to know its own geographic location and to determine the location of the agent device based on its own location information. The Agent Authentication Service located on a separate device from the agent device can determine the location of the agent device by one or more of several techniques that will be described in greater detail herein below:

The Agent can include logic and/or circuitry located on the agent device that requires keys for various operations such as unlocking the device, encrypting or decrypting media such as computer memory, network links, wifi, etc. The Agent may authenticate directly to the Key Management Service (Key-Master) if the agent device has connectivity and location information, or it can proxy its authentication request through a separate Agent Authentication service (Gate-Keeper) as discussed above. As discussed above, if the agent device has location information it can function as an Agent and also as an Agent Authentication Service. If the agent device does not have location information, it must proxy the Agent Authentication to another device separate from the agent device.

Access to the Agent Authentication Service (Gate-Keeper) by Agents should be to devices within the administratively trusted or approved location. There are multiple techniques to limit this connection, such as but not limited to access control lists, only allowing connections within the same broadcast domain, traceroute from the Agent Authentication Service to the Agent, round-trip-time (RTT), etc. The limited access to the Agent Authentication Service means that the Agent shares its trusted location. Agents can then request those cryptographic keys and policy attributes to access resources. These resources can include cryptographic keys for: WiFi Aps for clients: accessing encrypted data on computer storage: Encrypting and decrypting data: Accessing HTTPS and SSH servers, etc. The policy attributes can include, for example: database access such as related to specific records: ACL for network access: read and write or read-only level file access: ACLs for identity of users or devices, etc.

Furthermore, computer resources such as servers, virtual machines, and containers can consult the Agent Authentication Service (Gate-Keeper) for its trusted location to see if it fits within its geographically approved location (geofence). If it is outside of its designated location, it can shut down, clear all data (wipe system), and or refuse to start.

The Key Management Service (Key-Master) should have certificates for the Agent Authentication Service and the Agent and can have public keys added to its data base. The Agent Authentication Service can perform a registration service, which can have the following operational flow: The Agent Authentication Service learns the IP address of the Key Management Service. This can be by mechanisms such as DNS, DHCP attribute or configuration. The Agent Authentication Service determines its own location from an external source. The Agent Authentication Service initiates a secure connection (ie: TLS1.3 session) using ECDHE/ECDSA with the Key Management Service. The Key Management Service responds with a server certificate, request for the client certificate and using Encrypted Extension requests location and SUDI from the Agent Authentication Service. The Agent Authentication Service responds with the client certificate and sends location and SUDI in encrypted extension response. The Key Management Service validates the client certificate, then validates the location and SUDI to see if the device is in a valid location. If the Agent Authentication Service is in a trusted location, the Key Management Service encrypts the cryptographic keys and policy attributes with the Agent Authentication Service's public key and sends it to the Agent Authentication Service over the established trusted channel.

The Agent can also be registered by a process that includes the following flow. The Agent learns the IP address of the Agent Authentication Service via mechanisms such as DNS, DHCP attribute of configuration. The Agent initiates a secure (ie: TSL1.3) session using ECDHE/ECDSA with the Agent Authentication Service. The Agent Authentication Service determines whether the Agent secure (ie: TLS1.3) client hello originates as part of its administrative domain. If the Agent is within the Agent Authentication Service's administrative domain it responds with an Agent Authentication Service certificate, request for Client Certificate (Agent) and, using Encrypted Extensions, requests SUDI for the Agent. The Agent responds with a Client Certificate and sends SUDI in an encrypted extension response. The Agent Authentication Service signals to the Key Management Service over the secure channel that the Agent is valid sending SUDI encrypted with the Key Management Service's public key. The Key Management Service decrypts the SUDI with its private key, validates the SUDI against the Agent Authentication Service's location. If the SUDI is in a trusted location, the Key Management Service encrypts the cryptographic keys and policy attributes for the Agent with the Agent's public key and sends it to the Agent Authentication Service. The Agent Authentication Service passes the encrypted cryptographic keys and policy attributes to the Agent over its established secure channel. The Agent Authentication Service does not have access to the Agent's cryptographic keys or policy attributes. The Agent decrypts the response with its private key, then uses the cryptographic keys and policy attributes for their designated purpose (keys to decrypt its media, storage, network link, wifi, etc.) or simply validates that it is operating in the proper location. Preferably, the Agent does not store the cryptographic keys or policy attributes in any non-volatile computer memory.

The disclosed techniques for ensuring enforcement of geographic location specific security policies can find useful application in a variety of situations. For example, the techniques can be useful in situations regarding data sovereignty where stored data should not leave a specified geographic location such as a certain country. The techniques can be useful for protecting Intellectual Property leakage where certain computer resources must reside in certain locations, such as for example a customer's computer network. The techniques can also be useful with regard to encryption technologies such as IPSec, MACsec, TLS, who's location must be in specific geographic locations to function and properly execute the key exchange process. The techniques can also be useful with regard to compliance policies such as FedRAMP, by checking to assure a process is run within the compliant security control boundary of its intended deployment. Hardware root of trust can also be validated and enforced for cases where hardware is compromised, at least by validating that the geographic location is trusted. The applications and run-time can also leverage this geographic location trust and enable runtime or interact with the Agent Authentication Service for their trusted runtimes. The geographic location of infrastructure can also be tied to cost and pricing of the service, that a CSP provides as a value-added service. As locations may have disparate underlying cost structures. Remote management, remote operations and remote observability can also be policed based on the geographic location policies.

FIG. 1 shows a schematic illustration of a computer networking environment 100 for validating a geographic location of an agent device 102. The agent device 102 can be connected with a computer network 104, which in one embodiment can be an enterprise network or Local Area Network (LAN). In other embodiments, the network 104 can be a Virtual Local Area Network (VLAN), Virtually Extensible Local Area Network (VXLAN), Wide Area Network (WAN), etc.

In the embodiment shown in FIG. 1, the agent device 102 is shown as a laptop computer. However, the agent device 102 could be one of many other types of devices such as, but not limited to: An autonomous or otherwise network connected car 106; an network connected aircraft such as a drone 108: computer server 112: a cellular phone 113: Internet of Things (IOT) device such as but not limited to a sensor 114 or one or more of various types of network connected tools 116 such as a smart watch, or other fitness or tracking device.

The agent device 102 includes agent logic and or circuitry 118 for implementing geographic location dependent security policies. In one embodiment, this geographic location dependent security policies dictate that one or more aspects or features of the agent device can only be implemented or accessed if the agent device 102 is located within an approved geographic location or boundary, indicated schematically by dashed line 120. For example, in one embodiment, the geographic boundary 120 could be a building, such as a government or military building or complex, a business campus or building, etc. Implementing the geographic location dependent security policies can ensure that sensitive data such as classified information, sensitive proprietary business or technical information, etc. cannot be lost or, even worse, pirated or stolen by a hostile entity such as a foreign government, business or malicious hacking entity. In another embodiment, the geographic boundary 120 can be a geographic boundary such as a sovereign defined entity such as a country, state, county, city, etc. In one embodiment this geographic location-based security policy can ensure that export control laws are not violated by accessing sensitive information that may reside on the agent device 102 when the agent device 102 is located outside of the geographic boundary 120.

When opening the agent device 102 or accessing memory or logic of the agent device 102 (depending upon the geographic location specific security policy), the agent logic 118 sends a request for a cryptographic key to an Agent Authentication Service 122. In one embodiment, the Agent Authentication Service 122 can reside on a computer device such as a server 124, which in one embodiment can be connected with the computer network 104. The Agent Authentication Service can act as a gatekeeper for providing cryptographic keys to the agent device 102. The Agent Authentication Service (which will be described in greater detail herein below) includes logic, circuitry and/or memory for identifying the agent device, determining geographic location security policies for the user device, and determining whether to grant cryptographic key access to the agent device 102. In another embodiment, if the agent device 102 does not actually require a cryptographic key, the key management service 126 can provide the agent device 102 with other location specific security policies which may affect access to the agent device 102.

If the Agent Authentication Service 122 determines that the agent device is within a geographic location that satisfies the agent specific geographic location security policy, then the Agent Authentication Service 122 sends a request to a Key Management Service 126. The Key Management Service (key-master) 126 delivers one or more cryptographic keys 128 to the Agent Authentication Service 122. The Agent Authentication Service (gate-keeper) can then send the cryptographic key 128 to the Agent device 102. The agent device 102 can then engage the Agent 118 to open the agent device 102 or access memory (not shown) of the agent device 102 as determined by the geographic location security policy specific to the agent device 102. In one embodiment, the Agent Authentication Service 112 can deliver the cryptographic key through the computer network 104. In one embodiment, the key management service (key-master) can reside on one or more computer devices such as one or more servers 130. In one embodiment, the key-management service can be remote from the computer device 124 one which the agent authentication service 122 resides, and can be accessed, for example through a separate network such as a Wide Area Network (WAN) such as the internet 134. In another embodiment, the Key Management Service 126 can be employed within the same domain as the Agent Authentication Service 122 and can also be connected with the same computer network 104.

In some instances, an agent device such as the agent device 102 of FIG. 1 does not have a way of knowing its geographic location. This may be intentional for security purposes. For example, a device may have no geo-positioning capabilities (such as GPS) in order to prevent tracking of a user of the device. For example, military or other personnel using a smart watch or health tracking device might not want the location of the wearer to be known in order to prevent attacks or sabotage by enemy combatants or terror organizations. In this case, the Agent Authentication Service (gate-keeper) can include logic and/or circuitry for determining the geographic location of the agent device 102. For example, if the user device 102 and the Agent device 124 on which the agent authentication service 122 reside are connected with the same physical network 104, such as an enterprise network or data-center, then the agent authentication service can validate that the agent device is within a certain geographic range over which the network 104 extends.

One way in which the agent authentication agent 122 can determine the location of the agent device 102 is by determining which interface the agent device 102 responded to on the authentication service device 124. For example, if the agent authentication device 124 is the default gateway for the subnet or subnets, the response would be on the "inside" interface. This would indicate that the agent device 102 is local. Another way to determine the location of the agent device 102 is by checking the IP address of the agent device 102. The IP address of the agent device 102 imbedded into an encrypted message sent by the agent device 102 to ensure that it is valid and part of a local subnet. Yet another way to determine the location of the agent device 102 is by examining the round-trip-time (RTT). If the agent authentication service 122 sends a message to the agent, the agent authentication service can see how long the message takes to return.

Another way to determine the location of an agent device 102 is through the device's SKU. When using a Wi-Fi access point the agent device 102 can have a country specific SKU as required by various regulations. If the approved geographic location is, for example, a country, the agent authentication service 122 can use the GPS location of the agent authentication device 124 or agent device 102 by accessing its country code specific settings. The Agent could also implement Automated Frequency Coordination, requiring a location of the agent device 102 to be sent to a central location. In one embodiment, the agent authentication device 124 could function as a local, geographically aware metadata server.

Figure 2:
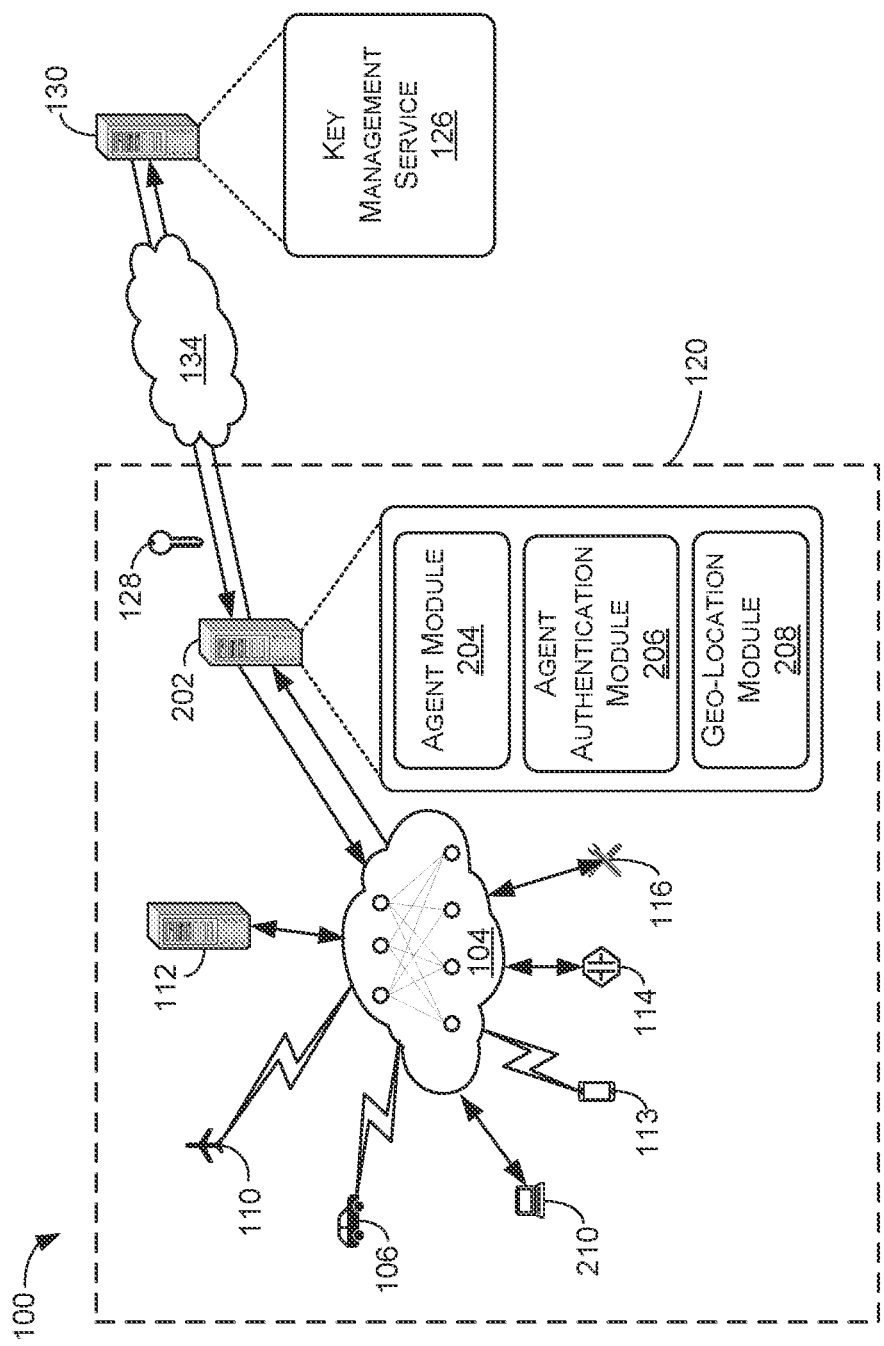
FIG. 2 is a schematic illustration showing a system for enforcing location-based security policies according to another embodiment.

FIG. 2 is a schematic illustration of a system for implementing geographic location-based security policies according to another embodiment. As seen in FIG. 2 a computer device 202 can function as both an agent device and an agent authentication device. In this case, the computer device includes mechanisms and/or techniques for determining its own geographic location. This could include geo-positioning service (GPS) capabilities. This could also include mechanisms such as those described above, which may include various techniques related to the device's connection within the network 104 as described above.

While the agent device 202 is shown in FIG. 2 as being a server computer device, the agent device could be one of many other different devices, such as but not limited to: another computer device 112; an autonomous aircraft such as a drone 110; an autonomous vehicle, such as a self-car or delivery vehicle 106; a laptop computer 210 or tablet, a cellular phone, or other personal electronic device 113; a network connected sensor device 114; or one of various types of network connected tools such as a personal tracking device, health tracker smart watch or any of various types of smart tools 116. The agent device 202 (as well as the other described devices) can be connected with a network 104, which can be a Local Area Network (LAN) such as an enterprise network or datacenter, a Virtual Local Area Network (VLAN), a Virtually Extensible Local Area Network (VXLAN), a Wide Area Network (WAN), etc.

The agent device 202 can include logic and/or circuitry that includes an Agent Module 204, an Agent Authentication Module 206, and a Geo-Location Module 208. The Agent Module includes logic and/or circuitry that prevents activation of one or more aspects of the agent device 202 until a specific cryptographic key 128 has been received to allow that aspect of the computer to be activated. For example, the Agent Module 204 may prevent the agent device 202 from completely opening or functioning until the cryptographic key 128 has been received. As another example, the Agent Module 204 may prevent access to all or a specific portion of computer memory (not shown) until the cryptographic key 128 has been received. Upon recognizing this requirement for the cryptographic key 128, the Agent Module 204 can initiate a request for the cryptographic key 128, which can be processed by the Agent Authentication Module, as will be seen.

The Agent Authentication Module 206 includes memory, logic and/or circuitry that stores particular geographic location specific security policies for the agent device 202. These geographic location specific security policies can be static (in that they don't change) or can be programmable or otherwise changeable with changing security needs. This can include, for example changes in regulations such as export control laws or changes with regard to the type of information or data stored on or processed by the agent device 202.

The Agent Authentication Module 206 accesses the Geo-Location Module 208 to determine the geographic location of the agent device 202. If the Agent Authentication Module 206 determines that the agent device 202 is located within an approved geographic location such as defined by geographic location boundary 120, then the Agent Authentication Module 206 sends a request to the Key Management Service 126 for a cryptographic key 128. In one embodiment, the request for the cryptographic key 128 can be sent to the Key Management Service 128 through a computer network 134 such as a Wide Area Network (WAN) such as the Internet. The key request could also be sent through some other more secure network connection such as a secure Large Area Network (LAN) line, Virtual Large Area Network (VLAN), etc. In another embodiment, the Key Management Service 126 could be a part of the enterprise network as the agent device 202 such as by being connected with the network 104.

The Geo-Location Module 208 can determine the geographic location of the agent device 202 through one or more of various means such as described above. For example, the Geo-Location Module can include circuitry and logic for determining the location based on information from Geo-Positioning Satellite (GPS) technology. In other embodiments, the Geo-location Module 208 can determine the location of the agent device 202 based on information related to the agent devices connection with the network 104.

If the Agent Authentication Module 206 determines that the agent device 202 is within the approved geographic location 126, then the Agent Authentication Module 206 sends a request for a cryptographic key to the Key management service 126. The key management service then delivers the cryptographic key to agent device 202 which allows the agent device 202 to access the desired logic or software. In one embodiment, the cryptographic key 128 allows the agent device 202 to fully turn on and fully open. In other embodiments, the cryptographic key 128 may allow the agent device to access a secured memory or database. In one embodiment, the Key Management Service 126 can send the cryptographic key 128 to the Agent Authentication Module 206 of the agent device 202. The Agent Authentication module can then deliver the cryptographic key 128 to the Agent Module 204 which include logic and/or circuitry for using the cryptographic key 128 to allow access to the agent device 202 or secured memory of the agent device 202.

If the Agent Authentication Module 206 determines, after accessing the Geo-Location Module 208, that the agent device 202 is outside of the approved geographic location 120, then the Agent Authentication Module does not send a request for a cryptographic key 128 to the Key Management Service 126. In that case, access to the agent device 202 or secured memory of the agent device 202 is denied in order to ensure that geographic location-specific security policies are enforced properly.

Figure 3:
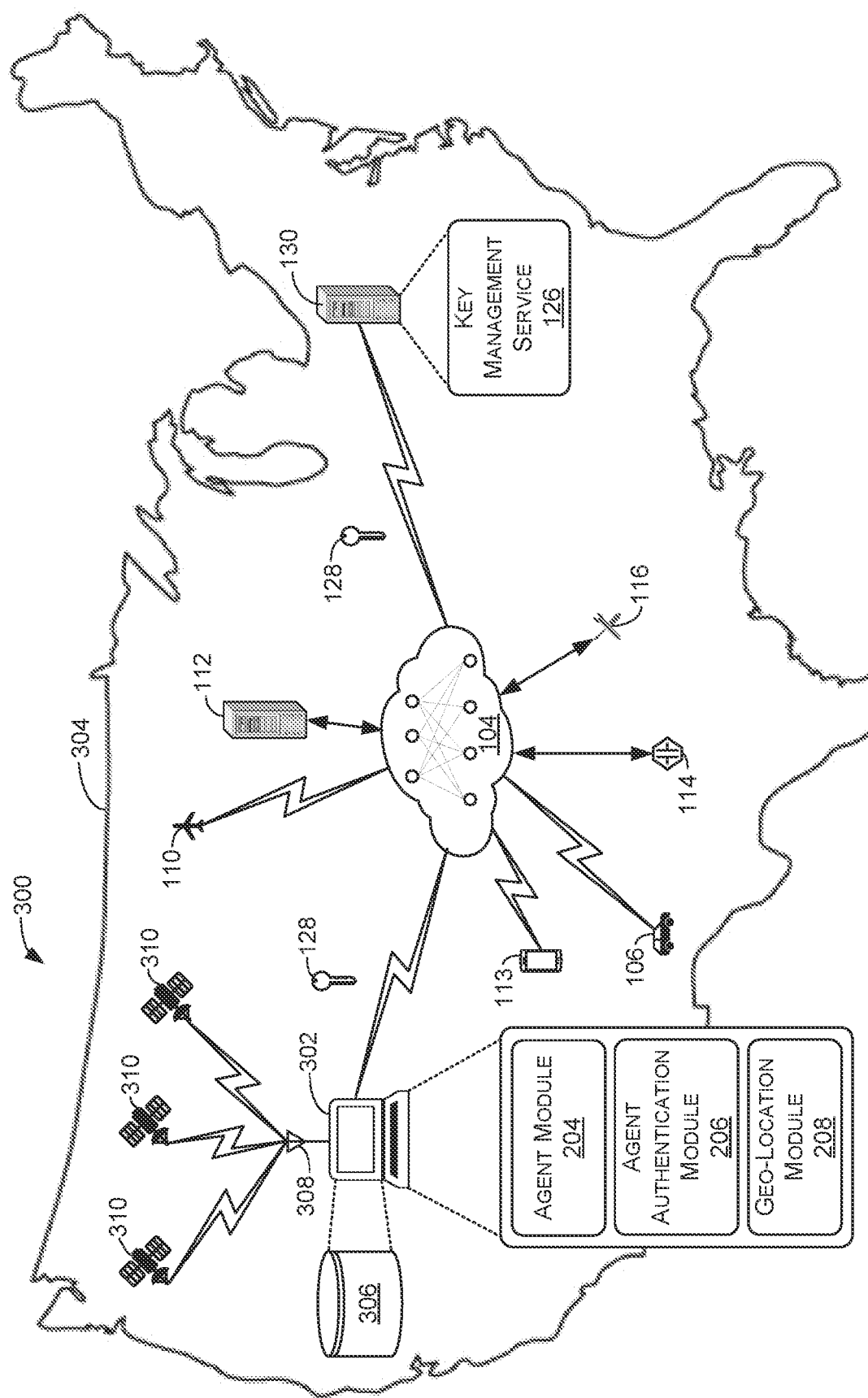
FIG. 3 is a schematic illustration showing a system for enforcing location-based security policies related a geographic boundary environment.

FIG. 3 is a schematic illustration of an application of a system 300 for enforcing geographic location specific security policies. The system 300 includes an agent device 302 that has geographic location specific security policies that are configured to prevent operation of all or an aspect of the agent device when the agent device is located outside of a geographic region such as defined by outline 304 in FIG. 3. In some embodiments, the geographic region 304 can be a sovereign defined region, such as but not limited to, a country, state, county, city, etc. In some embodiments, the implementation of these geographic location specific security policies can prevent violation of laws or regulations, such as export control laws. These embodiments can also avoid security issues, such as preventing disclosure of sensitive military or proprietary technology outside of a given jurisdiction. In another embodiment, the use of such geographic location specific security policies can be used to prevent access to one or more aspects of the agent device 302 when the agent device 302 is moved into a prohibited region, such as within a hostile country or within certain regions of a war zone.

In the implementation shown in FIGS. 3, the agent device is shown as being a laptop computer. However, as described above, the agent device could be one of many different types of devices. For example, the agent device could be: a server 112: a drone or other type of aircraft 110: a cellular phone 113, a vehicle such as an autonomous car 106; a smart sensor 114, one or more of many different types of smart tools 116, etc.

In one possible environment, the agent device can be a device such as a military drone 110, and the geographic location specific security policies can be configured to prevent access to sensitive military technology if the done 110 is shot down or captured within a hostile region or by a hostile country. In another possible implementation, the agent device could be an autonomous vehicle such as an autonomous aircraft 110 or autonomous car 106, and the geographic location specific security policies can be used to only allow operation of the autonomous vehicle 110, 106 is within a region where use of such autonomous vehicles are allowed. For example, if the use of autonomous, self-driving cars is allowed within certain cities, the geographic location specific security policies can prevent the use of the autonomous vehicle 106, 110 only within that city.

As with the previously described embodiments, the user device 302 can include an Agent Module 204, an Agent Authentication Module 206 and a Geo-Location Module 208. In one embodiment, the agent device 302 may include a memory or database 304, access to which can be blocked or allowed based on the geographic location specific security policy. In the embodiment shown in FIG. 3, the agent device 302 can include the ability to know its geographic location. In one embodiment, this may include circuitry and/or logic for implementing a Global Positioning System (GPS). The user device 302 may include an antenna 308 and may include the ability to receive signals from three or more GPS satellites 310 in order to triangulate to determine its geographic location. In other embodiments, other techniques may be implemented in order for the agent device 302 to determine its geographic location.

As described above, the Agent Module 204 includes logic and/or circuitry that prevents activation of one or more aspects of the agent device 302 until a specific cryptographic key 128 has been received to allow that aspect of the computer to be activated. For example, the Agent Module 204 may prevent the agent device 302 from completely opening or functioning until the cryptographic key 128 has been received. As another example, the Agent Module 204 may prevent access to all or a portion of the computer memory 306 until the cryptographic key 128 has been received. Upon recognizing this requirement for the cryptographic key 128, the Agent Module 204 can initiate a request for the cryptographic key 128, which can be processed by the Agent Authentication Module, as will be seen.

The Agent Authentication Module 206 includes memory, logic and/or circuitry that stores geographic location specific security policies for the agent device 302. These geographic location specific security policies can be static (in that they don't change) or can be programmable or otherwise changeable with changing security needs. This can include, for example changes in regulations such as export control laws or changes with regard to the type of information or data stored on or processed by the agent device 302.

The Agent Authentication Module 206 accesses the Geo-Location Module 208 to determine the geographic location of the agent device 302. If the Agent Authentication Module 206 determines that the agent device 302 is located within the approved geographic location such as defined by geographic location boundary 304, then the Agent Authentication Module 206 sends a request to the Key Management Service 126 for a cryptographic key 128. In one embodiment, the request for the cryptographic key 128 can be sent to the Key Management Service 128 through a computer network 134 such as a Wide Area Network (WAN) such as the Internet. The key request could also be sent through some other more secure network connection such as a secure Large Area Network (LAN) line, Virtual Large Area Network (VLAN), etc.

The Geo-Location Module 208 can determine the geographic location of the agent device 202 through one or more of various means such as described above. For example, the Geo-Location Module can include circuitry and logic for determining the location based on information from Geo-Positioning Satellite (GPS) technology as described. In other embodiments, the Geo-location Module 208 can determine the location of the agent device 202 based on information related to the agent devices connection with the network 104.

If the Agent Authentication Module 206 determines that the agent device 302 is within the approved geographic location 304, then the Agent Authentication Module 206 sends a request for a cryptographic key to the Key management service 126. The key management service then delivers the cryptographic key to agent device 302 which allows the agent device 302 to access the desired logic or software. In one embodiment, the cryptographic key 128 allows the agent device 302 to fully turn on and fully open. In other embodiments, the cryptographic key 128 may allow the agent device to access a secured memory or database. In one embodiment, the Key Management Service 126 can send the cryptographic key 128 to the Agent Authentication Module 206 of the agent device 302. The Agent Authentication module can then deliver the cryptographic key 128 to the Agent Module 204 which includes logic and/or circuitry for using the cryptographic key 128 to allow access to the agent device 302 or secured memory 306 of the agent device 302.

If the Agent Authentication Module 206 determines, after accessing the Geo-Location Module 208, that the agent device 202 is outside of the approved geographic location 304, then the Agent Authentication Module does not send a request for a cryptographic key 128 to the Key Management Service 126. In that case, access to the agent device 302 or secured memory 306 of the agent device 302 is denied in order to ensure that geographic location-specific security policies are enforced properly.

In the embodiment shown in FIG. 3, the agent device has the ability to determine its own geographic location. In this case, the user device can include its own location. This is similar to the system described above with regard to FIG. 2. In other embodiments, the agent device may not have the capability to determine its own location. In that case, an Agent Authentication Module may be provided on a separate agent authentication device that as the ability to determine the location of the agent device 302. This can include techniques similar to those described above with reference to FIG. 1.

Figure 4:
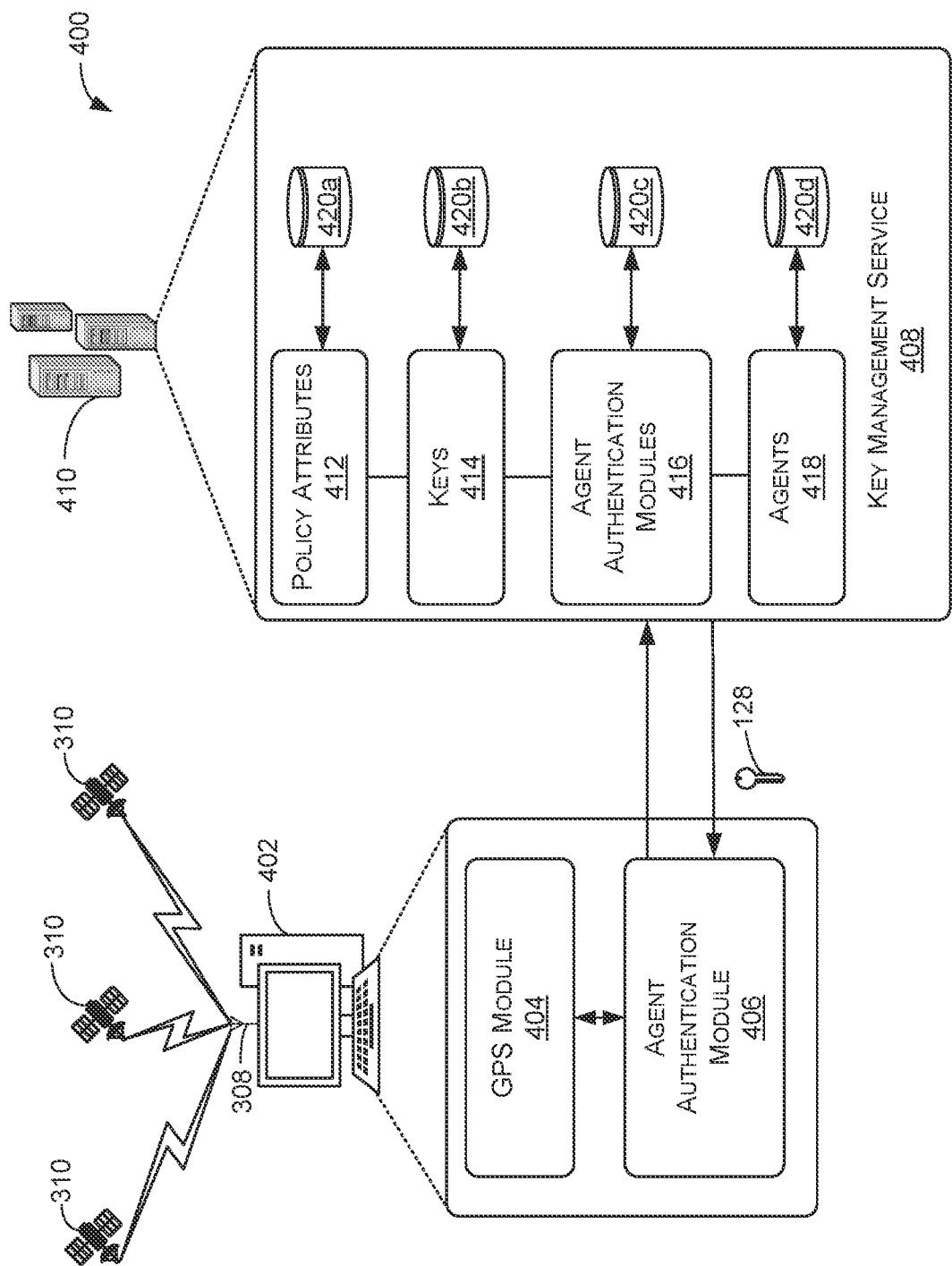
FIG. 4 is a schematic illustration showing a system for enforcing location-based security policies according to an embodiment.

FIG. 4 shows an enlarged, detailed schematic illustration of a system 400 for implementing geographic location specific security policies wherein an agent device 402 has the ability to know its geographic location. The agent device 402 includes a Geo-Positioning (GPS) Module 404 which includes logic and/or circuitry for determining its location based on triangulation with one or more GPS satellites 310.

The agent device 402 includes also includes an Agent Authentication Module 406. The Agent Authentication Module include memory, circuitry and/or logic storing location specific security policies relevant to the agent device 402. The Agent Authentication Module 404 accesses information from the GPS module to determine the geographic location of the agent device 402 and compares this geographic location information with the location specific security policies for the agent device 402. If the Agent Authentication Module determines that the agent device 402 is located within an approved location, then the Agent device sends a request for a cryptographic key 128 to a key management service 408. If the Agent Authentication Module determines that the agent device 402 is outside of the approved geographic location, then the Agent Authentication Module does not request the cryptographic key 128, and access to one or more aspects of the agent device 402 are denied as required by the geographic location specific security parameters.

The Key Management Service 408 can be embodied on one or more server devices 410 which may be cloud-based servers accessed over a Wide Area Network (WAN) such as the internet. The Key Management Service can include: a database of Policy Attributes 412, a database of Keys 414, a database of Agent Authentication Modules 416, and a database of Agents 418, all of which can be stored one or more computer memory devices 410a-d.

When the Key Management Service 408 receives a request for a key from the Agent Authentication Module 406, it checks the database of Agent Authentication Modules 416 and database of Agents 418 to identify the particular agent and Agent Authentication Module 406. The Key Management Service 408 then accesses the Policy Attributes Database 412 to determine a geographic location specific policy attribute for the specific key-requesting agent and Agent Authentication Service 406. The Key Management Service then accesses the Keys database to select a cryptographic key 128 applicable to the agent device 402 and location. The key 128 can then be delivered to the Agent Authentication Module 406.

Figure 5:
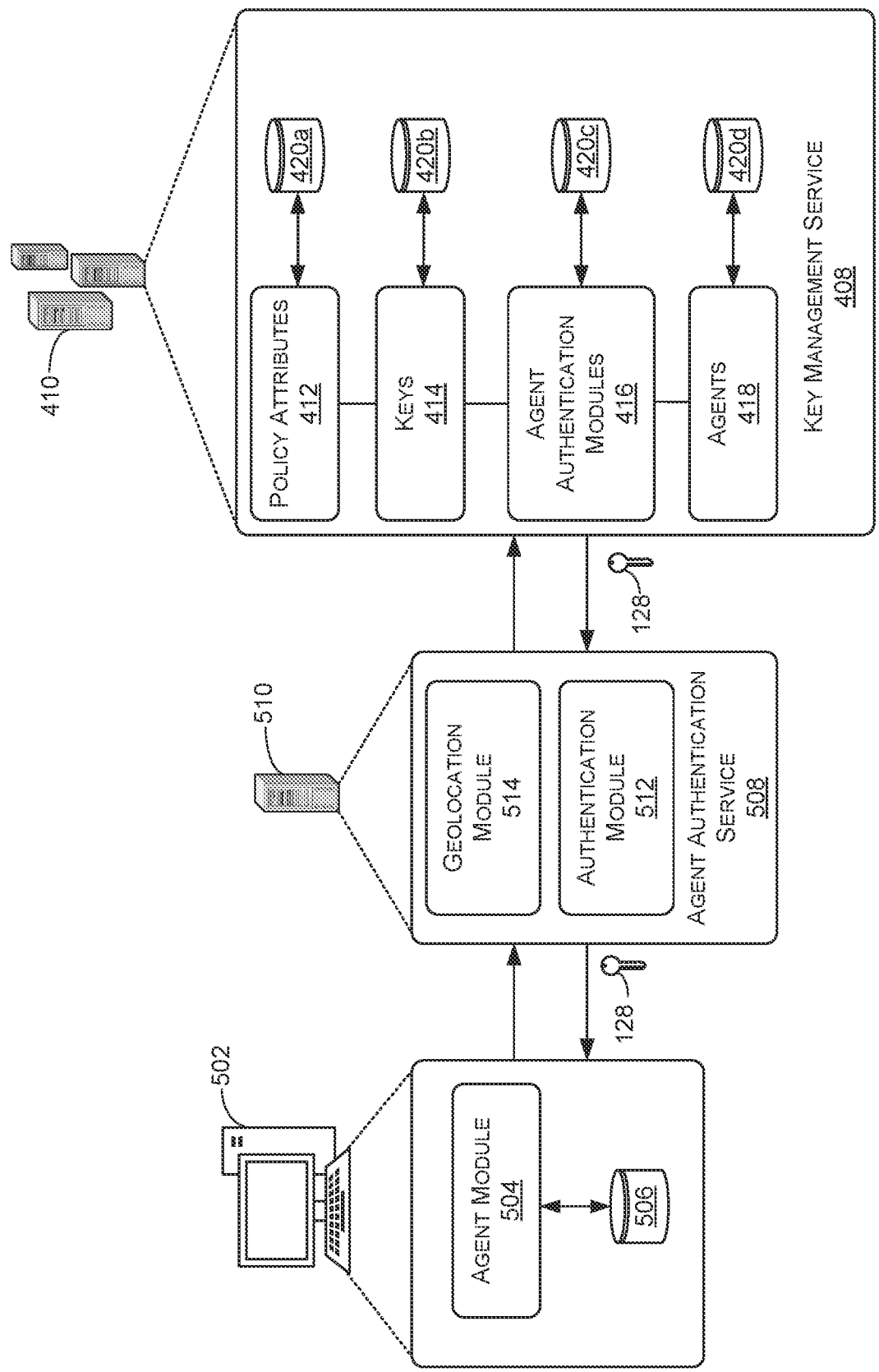
FIG. 5. is a schematic illustration showing a system for enforcing location based security policies according to another embodiment.

FIG. 5 shows a schematic of another embodiment of a system for implementing geographic location specific security policies for an agent device 502. In this embodiment, the agent device 502 does not include capability for determining its own location. This can be an intentional feature of the user device, such as for security considerations in order to prevent hostile outside parties from knowing the location of the agent device 502 or user of the agent device 502. The agent device 502 includes an Agent Module 504 that includes logic and/or circuitry for limiting access to one or more aspects of the user device 502 unless a cryptographic key 128 has been received to allow such access. The Agent Module logic as well as the cryptographic key 128 can be stored in computer memory 506.

Upon opening the agent device 502 or upon attempting to activate a specific program or computer memory of the agent device 502, the Agent Module 504 sends a key request to an Agent Authentication Service 508. The Agent Authentication Service 508 can be embodied on a service device 510 that is separate from the agent device 502, but which may be connected with the same computer network as the agent device 502.

The Agent Authentication Service 508 includes an Authentication Module 512 and a Geolocation Module 514. When, the Authentication Module 512 receives the key request from the Agent Module 504, the Authentication Module accesses a database of agent devices and agent security policies to determine which, if any, location specific security policies apply to the Agent Device 502.

The Authentication Module 512 then accesses the Geolocation Module 514 to determine the geographic location of the Agent Device. The Geolocation Module includes logic and/or circuitry for determining the physical geographic location of the agent device 502. If the Agent device is within an approved location based on the geographic location security policies for that agent device 502, the Authentication Module 512 sends a request to the Key management Service 408. If the Authentication Module 512 determines that the agent device is not within the approved geographic location, then the Authentication Module 512 does not send the request to the Key Management Service 408.

One way in which the Geolocation Module 514 can determine the location of the agent device 502 is by determining which interface the agent device 502 responded to on the authentication service device 510. For example, if the agent authentication device 510 is the default gateway for the subnet or subnets, the response would be on the "inside" interface. This would indicate that the agent device 502 is local. Another way to determine the location of the agent device 502 is by checking the IP address of the agent device 502. The IP address of the agent device 502 imbedded into an encrypted message sent by the agent device 502 to ensure that it is valid and part of a local subnet. Yet another way to determine the location of the agent device 502 is by examining the round-trip-time (RTT). If the agent authentication service 510 sends a message to the agent, the agent authentication service can see how long the message takes to return.

As described above with reference to FIG. 4, the Key Management Service 408 can be embodied on one or more server devices 410 which may be cloud-based servers accessed over a Wide Area Network (WAN) such as the internet. The Key Management Service can include: a database of Policy Attributes 412, a database of Keys 414, a database of Agent Authentication Modules 416, and a database of Agents 418, all of which can be stored one or more computer memory devices 420a-d.

When the Key Management Service 408 receives a request for a key from the Agent Authentication Module 512, it checks database of Agent Authentication Modules 416 and database of agent devices 502 to identify the particular agent device 502 and Agent Module 504. The Key Management Service 408 then accesses the Policy Attributes Database 412 to determine a geographic location specific policy attribute for the specific key-requesting agent device 502 and Agent Module 504. The Key Management Service then accesses the Keys database to select a cryptographic key 128 applicable to the Agent Authentication Service. The key 128 can then be delivered to the Agent Module 504 of the agent device 502.

Figure 6A:
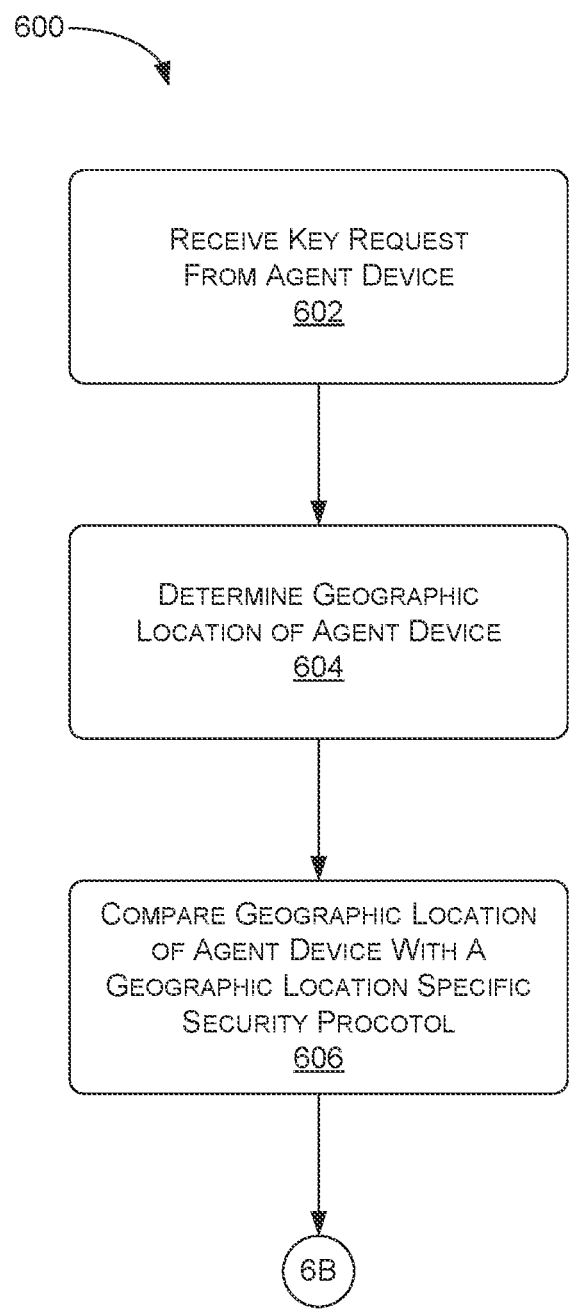
FIGS. 6A-6B show flow charts illustrating a method for ensuring enforcement of geographic location-based security.
Figure 6B:
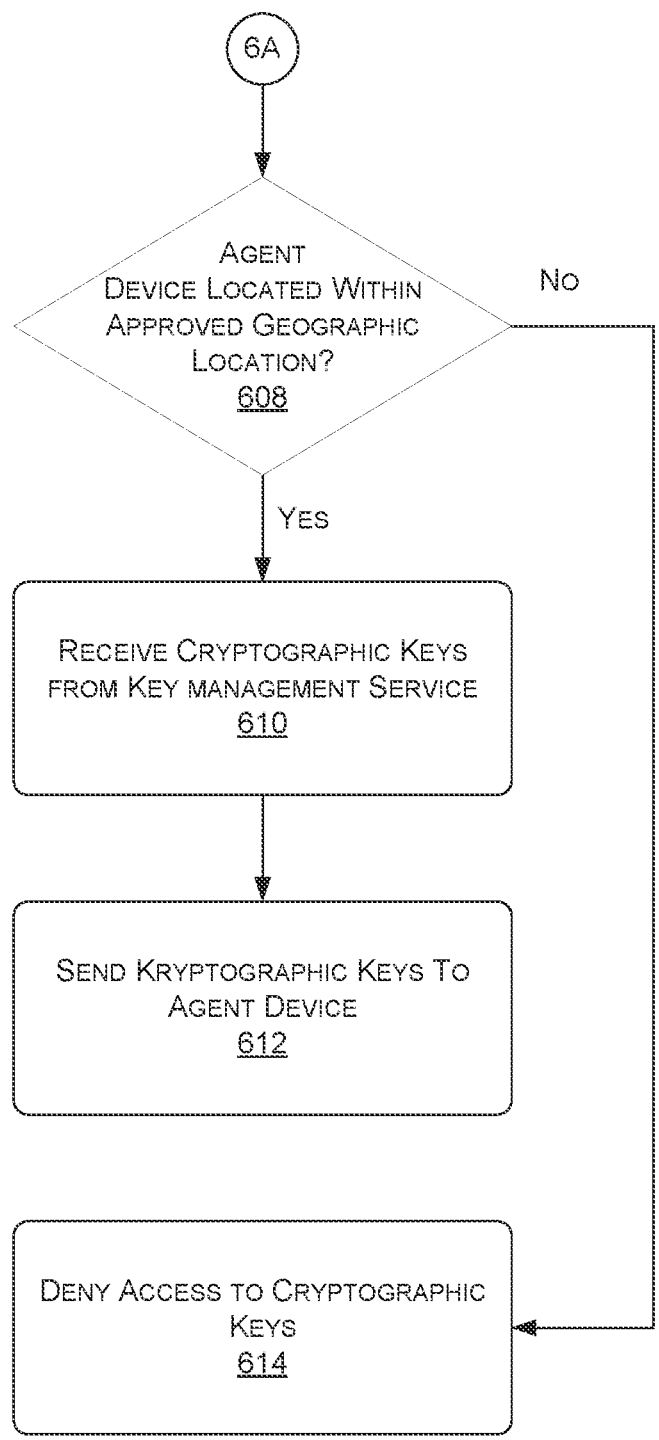

FIGS. 6A and 6B illustrate flow diagrams of example a method 600 that illustrate aspects of the functions performed at least partly by the devices described in FIGS. 1-5. The logical operations described herein with respect to FIGS. 6A and 6B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A and 6B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 6A and 6B are flow diagrams illustrating a method 600 for securely distributing cryptographic keys based on geographic location of an agent device 602. The geographic location of the agent device is determined 604. In one embodiment, the agent device determines its own geographic location, such as through use of a Geo-Positioning System (GPS) by triangulating with GPS satellites or can determine its own geographic location by some other method. In other embodiments one or more devices separate from the agent device. These separate one or more devices can function as an agent gatekeeper and can include agent authentication logic which can identify the agent device and that can determine the geographic location of the agent device.

The geographic location of the agent device is compared with one or more geographic location specific security policies 606. Based on the geographic location of the agent device and the one or more geographic location specific security policies, a determination is made as to whether the agent device is within an approved geographic location 608. If yes, the agent device is within an approved geographic location then a request for cryptographic keys is sent to a key management service and one or more cryptographic keys are received from the key management service 610. The key management service can include logic and computer storage for storing and retrieving information regarding agent devices, security policies and for storing and managing cryptographic keys. The cryptographic keys are then sent to the agent device to allow one or more features of the agent device to be activated 612. If, on the other hand, a determination is made that the agent device is not within the approved geographic location, in response to determining that the agent device is outside of the approved geographic location access to the cryptographic keys by the agent device is denied 614.

Figure 7:
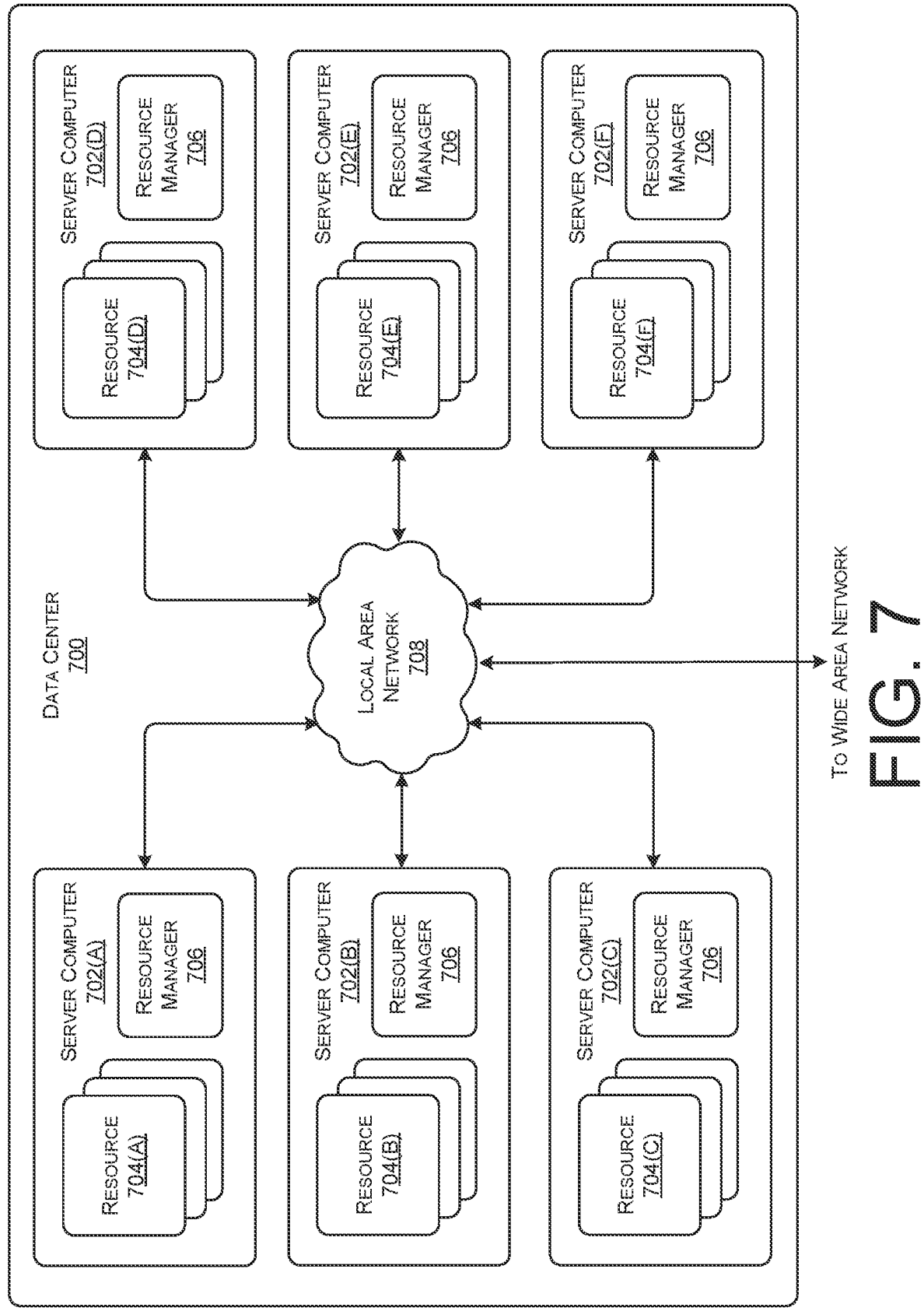
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein. In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
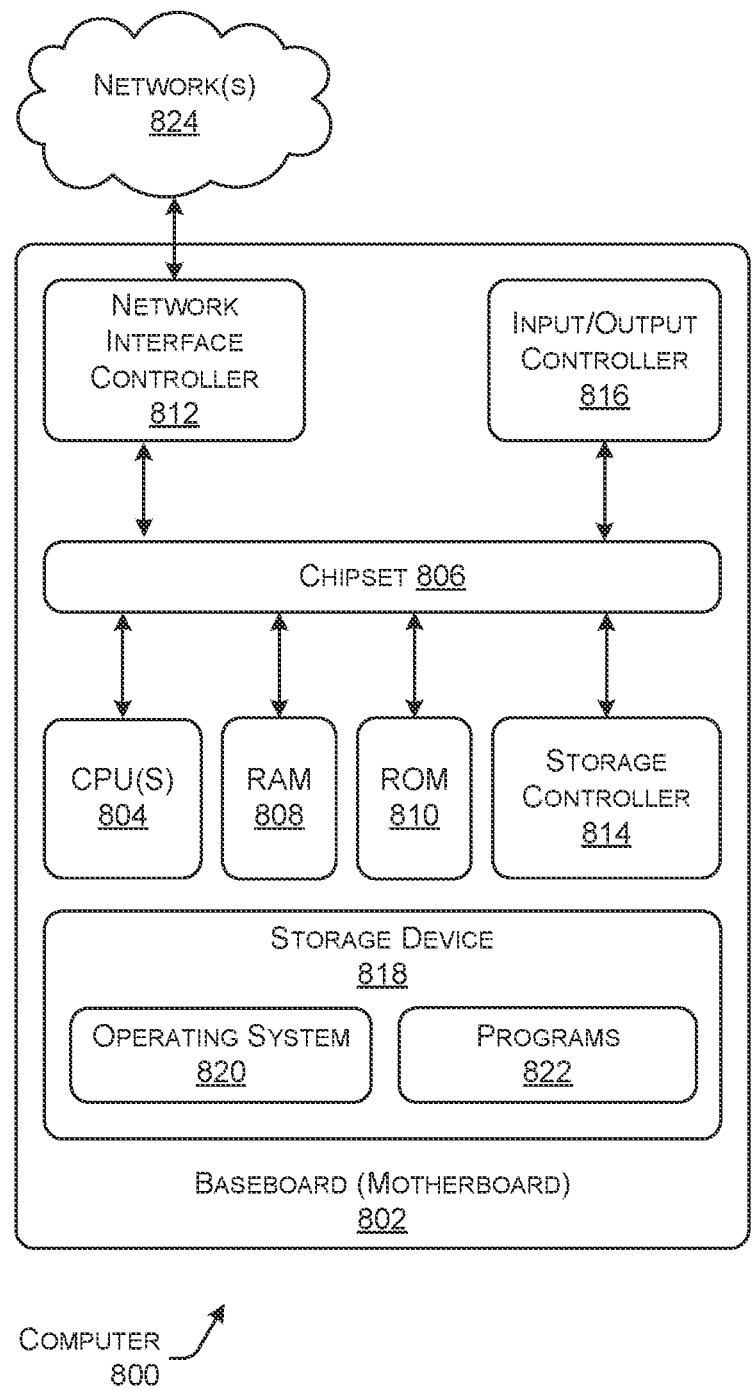
FIG. 8 is a computer architecture diagram showing an illustrative computer hardware architecture for implementing a computing device that can be utilized to implement aspects of the various technologies presented herein.

FIG. 8 shows an example computer architecture 800 for a computer such as the server computer 702 capable of executing program components for implementing the functionality described above. The computer architecture 800 shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network 824, such as the network 708 of FIG. 7. The chipset 806 can include functionality for providing network connectivity through a Network Interface Controller (NIC) 812, such as a gigabit Ethernet adapter. The NIC 812 is capable of connecting the computer 800 to other computing devices over the network 708 (and/or 102, 104, or 202). It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by devices in the distributed application architecture 100, and or any components included therein, may be supported by one or more devices similar to computer 702.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS®: SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-6. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure. The programs 822 may comprise any type of program that cause the computer 800 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for securely distributing cryptographic keys based on geographic location, the method comprising:
   receiving at a proxy device, a request from an agent device for access to cryptographic keys managed by a key management service, wherein the proxy device communicates data between the agent device and the key management service, wherein the proxy device is a separate device from the agent device;
   determining a geographic location of the agent device;
   comparing, at the proxy device, the geographic location of the agent device with a geographic location specific security policy to determine whether the agent device is located within an approved geographic location;
   receiving, at the proxy device, a digital certificate of the agent device;
   using the digital certificate, validating that the agent device is allowed to be located within the approved geographic location;
   in response to determining that the agent device is located within the approved geographic location and validating that the agent device is allowed to be located within the approved geographic location, sending a request to the key management service for a cryptographic key, wherein the request includes the digital certificate of the agent device that is used by the key management service to validate the agent device against the approved geographic location associated with the proxy device;
   receiving, at the proxy device, encrypted data that includes the cryptographic key from the key management service; and
   sending, from the proxy device, the encrypted data that includes the cryptographic key to the agent device without decrypting the encrypted data.

2. The method as in claim 1, wherein the proxy device includes logic for determining its own location and determining the location of the agent device based on the location of the proxy device.

3. The method as in claim 1, wherein the agent device includes logic for determining its own location.

4. The method as in claim 1, further comprising, in response to determining that the agent device is located within the approved geographic location, sending the cryptographic key to the agent device.

5. The method as in claim 1, further comprising accessing a policy database to determine the approved geographic location for the agent device.

6. The method as in claim 1, wherein the cryptographic key allows access to computer memory residing on the agent device.

7. A proxy device that ensures security based on geographic location of a device, the proxy device comprising:
    one or more processors; and
    one or more non-transitory computer-readable media storing computer-executable instructions that, when executed by the one or more processors, cause the one or more processors to perform operations comprising:
    receiving a request from an agent device for access to cryptographic keys managed by a key management service, wherein the proxy device communicates data between the agent device and the key management service, wherein the proxy device is a separate device from the agent device;
    determining a geographic location of the agent device;
    comparing the geographic location of the agent device with a geographic location specific security policy to determine whether the agent device is located within an approved geographic location;
    receiving a digital certificate of the agent device;
    using the digital certificate, validating that the agent device is allowed to be located within the approved geographic location;
    in response to determining that the agent device is located within the approved geographic location and validating that the agent device is allowed to be located within the approved geographic location, sending a request to the key management service for a cryptographic key, wherein the request includes the digital certificate of the agent device that is used by the key management service to validate the agent device against the approved geographic location associated with the proxy device;
    receiving encrypted data that includes the cryptographic key from the key management service; and
    sending the encrypted data that includes the cryptographic key to the agent device without decrypting the encrypted data.

8. The proxy device of claim 7, wherein the proxy device includes logic for determining its own location and determining the location of the agent device based on the location of the proxy device.

9. The proxy device of claim 7, wherein the agent device includes logic for determining its own location.

10. The proxy device of claim 7, the operations further comprising, in response to determining that the agent device is located within the approved geographic location, sending the cryptographic key to the agent device.

11. The proxy device of claim 7, the operations further comprising accessing a policy database to determine the approved geographic location for the agent device.

12. The proxy device of claim 7, wherein the cryptographic key allows access to computer memory residing on the agent device.

13. One or more non-transitory computer-readable media storing computer-executable instructions that, when executed by one or more processors, cause the one or more processors to perform operations comprising:
    receiving at a proxy device, a request from an agent device for access to cryptographic keys managed by a key management service, wherein the proxy device communicates data between the agent device and the key management service, wherein the proxy device is a separate device from the agent device;
    determining a geographic location of the agent device;
    comparing, at the proxy device, the geographic location of the agent device with a geographic location specific security policy to determine whether the agent device is located within an approved geographic location;
    receiving, at the proxy device, a digital certificate of the agent device;
    using the digital certificate, validating that the agent device is allowed to be located within the approved geographic location;
    in response to determining that the agent device is located within the approved geographic location and validating that the agent device is allowed to be located within the approved geographic location, sending a request to the key management service for a cryptographic key, wherein the request includes the digital certificate of the agent device that is used by the key management service to validate the agent device against the approved geographic location associated with the proxy device;
    receiving, at the proxy device, encrypted data that includes the cryptographic key from the key management service; and
    sending, from the proxy device, the encrypted data that includes the cryptographic key to the agent device without decrypting the encrypted data.

14. The one or more non-transitory computer-readable media of claim 13, wherein the proxy device includes logic for determining its own location and determining the location of the agent device based on the location of the proxy device.

15. The one or more non-transitory computer-readable media of claim 13, wherein the agent device includes logic for determining its own location.

16. The one or more non-transitory computer-readable media of claim 13, further comprising, in response to determining that the agent device is located within the approved geographic location, sending the cryptographic key to the agent device.

17. The one or more non-transitory computer-readable media of claim 13, the operations further comprising, accessing a policy database to determine the approved geographic location for the agent device.

* * * * *